US010346298B2

(12) United States Patent
Lee et al.

(10) Patent No.: US 10,346,298 B2
(45) Date of Patent: Jul. 9, 2019

(54) INTERVAL GARBAGE COLLECTION FOR MULTI-VERSION CONCURRENCY CONTROL IN DATABASE SYSTEMS

(71) Applicant: SAP SE, Walldorf (DE)

(72) Inventors: Juchang Lee, Seoul (KR); Chang Gyoo Park, Seoul (KR); Jaeyun Noh, Seoul (KR); Wolfgang Stephan, Walldorf (DE); Hyungyu Shin, Pohang (KR); Seongyun Ko, Pohang (KR)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 15/231,553

(22) Filed: Aug. 8, 2016

(65) Prior Publication Data

US 2017/0357577 A1 Dec. 14, 2017

Related U.S. Application Data

(60) Provisional application No. 62/348,429, filed on Jun. 10, 2016.

(51) Int. Cl.
*G06F 12/12* (2016.01)
*G06F 16/23* (2019.01)
*G06F 3/06* (2006.01)
*G06F 12/02* (2006.01)

(52) U.S. Cl.
CPC ......... *G06F 12/0253* (2013.01); *G06F 3/065* (2013.01); *G06F 3/067* (2013.01); *G06F 3/0619* (2013.01); *G06F 3/0641* (2013.01); *G06F 12/0261* (2013.01); *G06F 12/0269* (2013.01); *G06F 16/2322* (2019.01);

(Continued)

(58) Field of Classification Search
CPC ......... G06F 17/30289; G06F 17/30348; G06F 12/0269; G06F 12/0253; G06F 16/2329; G06F 16/2322; G06F 3/065; G06F 3/067; G06F 12/0261; G06F 3/0641; G06F 3/0619; G06F 2212/1044; G06F 2212/702
See application file for complete search history.

(56) References Cited

U.S. PATENT DOCUMENTS

| 7,930,274 | B2 | 4/2011 | Hwang et al. |
| 8,533,158 | B1 | 9/2013 | Rao |
| 2011/0251997 | A1 | 10/2011 | Wang et al. |

(Continued)

OTHER PUBLICATIONS

Lee et al., "Hybrid Garbage Collection for Multi-Version Concurrency Control in SAP HANA," *Proceedings of the 2016 International Conference on Management of Data Pages*, pp. 1307-1318, Jun. 26-Jul. 1, 2016.

(Continued)

*Primary Examiner* — Etienne P Leroux
(74) *Attorney, Agent, or Firm* — Klarquist Sparkman, LLP

(57) ABSTRACT

Technologies for performing garbage collection in database systems, such as multi-version concurrency control (MVCC) database systems, are described. For example, different garbage collection techniques can be used separately or in various combinations, including interval garbage collection, group garbage collection, table garbage collection, and combinations. For example, a particular type of combination, called hybrid garbage collection, uses technique from interval garbage collection and group garbage collection, or from interval, group, and table garbage collection.

20 Claims, 8 Drawing Sheets

(52) U.S. Cl.
CPC .. *G06F 16/2329* (2019.01); *G06F 2212/1044* (2013.01); *G06F 2212/702* (2013.01)

(56) References Cited

U.S. PATENT DOCUMENTS

| | | | | |
|---|---|---|---|---|
| 2013/0339301 | A1* | 12/2013 | Saito | G06F 17/30289 |
| | | | | 707/649 |
| 2014/0149353 | A1 | 5/2014 | Lee et al. | |
| 2016/0147449 | A1* | 5/2016 | Andrei | G06F 17/30348 |
| | | | | 707/814 |

OTHER PUBLICATIONS

Ashwin et al., "Garbage Collection in Object Oriented Databases Using Transactional Cyclic Reference Counting," In *Proceedings of the 23rd VLDB Conference*, pp. 366-375, 1997.

Barber, et al., In-memory BLU Acceleration in IBM's DB2 and dashDB: Optimized for Modern Workloads and Hardware Architectures. In *2015 IEEE 31st International Conference on Data Engineering*, pp. 1246-1252, Apr. 13-17, 2015.

Berenson, et al., "A Critique of ANSI SQL Isolation Levels," In *Proceedings of the 1995 ACM SIGMOD International Conference on Management of Data*, 13 pages, May 22-25, 1995.

Cha et al., "P*TIME: Highly Scalable OLTP DBMS for Managing Update-Intensive Stream Workload," In *Proceedings of the 30th VLDB Conference*, pp. 1033-1044, 2004.

Detlefs, et al., "Lock-Free Reference Counting," *Distributed Computing*, vol. 15, Issue 4, 19 pages, Dec. 2002.

Diaconu, et al., "Hekaton: SQL Server's Memory-Optimized OLTP Engine," In *Proceedings of the 2013 ACM SIGMOD International Conference on Management of Data*, pp. 1243-1254, ACM, Jun. 22-27, 2013.

Fraser, "Practical Lock-Freedom," Ph.D. thesis, Technical Report No. 579, University of Cambridge, 116 pages, Feb. 2004.

InnoDB, A feature request to InnoDB, https://bugs.mysql.com/bug.php?id=74919, 2 pages, Nov. 18, 2014.

Larson, et al., "High-Performance Concurrency Control Mechanisms for Main-Memory Databases," In *Proceedings of the VLDB Endowment*, vol. 5, No. 4, pp. 298-309, 2011.

Loesing, et al., "On the Design and Scalability of Distributed Shared-Data Databases," In *Proceedings of the 2015 ACM SIGMOD International Conference on Management of Data*, pp. 663-676, May 31-Jun. 4, 2015.

McKenney, et al., "Read-Copy Update: Using Execution History to Solve Concurrency Problems," In *Parallel and Distributed Computing and Systems*, pp. 509-518, Oct. 1998.

Michael, "Hazard Pointers: Safe Memory Reclamation for Lock-Free Objects," *IEEE Transactions on Parallel and Distributed Systems*, vol. 15, No. 6, pp. 491-504, Jun. 2004.

Neumann, et al., "Fast Serializable Multi-Version Concurrency Control for Main-Memory Database Systems," In *Proceedings of the 2015 ACM SIGMOD International Conference on Management of Data*, pp. 677-689, May 31-Jun. 4, 2015.

Plattner, "A Common Database Approach for OLTP and OLAP Using an In-Memory Column Database," In *Proceedings of the 2009 ACM SIGMOD International Conference on Management of Data*, 7 pages, Jun. 29-Jul. 2, 2009.

Github, "Facebook/RocksDB," < https://github.com/facebook/rocksdb/blob/master/db/compaction_iterator.cc>, 10 pages (accessed Nov. 27, 2018).

SAP, "SAP HANA: The In-Memory Platform for Digital Transformation," <https://www.sap.com/documents/2015/04/9629f881-217c-0010-82c7-eda71af511fa.html>, 13 pages (accessed Nov. 27, 2018).

Sikka, et al., "Efficient Transaction Processing in SAP HANA Database: The End of a Column Store Myth," In *Proceedings of the 2012 ACM SIGMOD International Conference on Management of Data*, pp. 731-741, May 20-24, 2012.

Tu, et al., "Speedy Transactions in Multicore In-Memory Databases," In *ACM Symposium on Operating Systems Principles*, pp. 18-32, Nov. 3-6, 2013.

Valois, "Lock-Free Linked Lists Using Compare-and-Swap," In *Proceedings of the Fourteenth Annual ACM Symposium on Principles of Distributed Computing*, pp. 214-222, Aug. 20-23, 1995.

\* cited by examiner

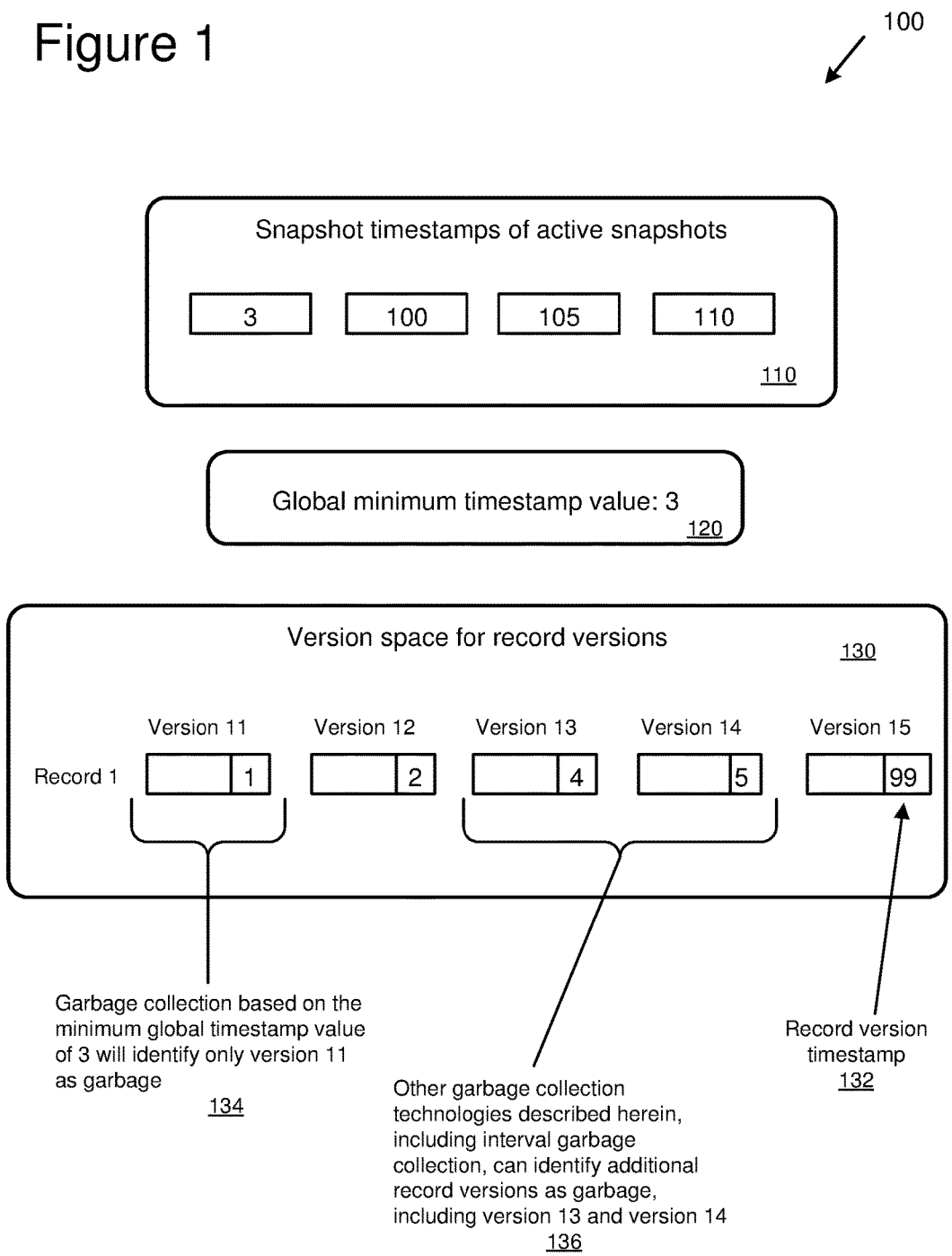

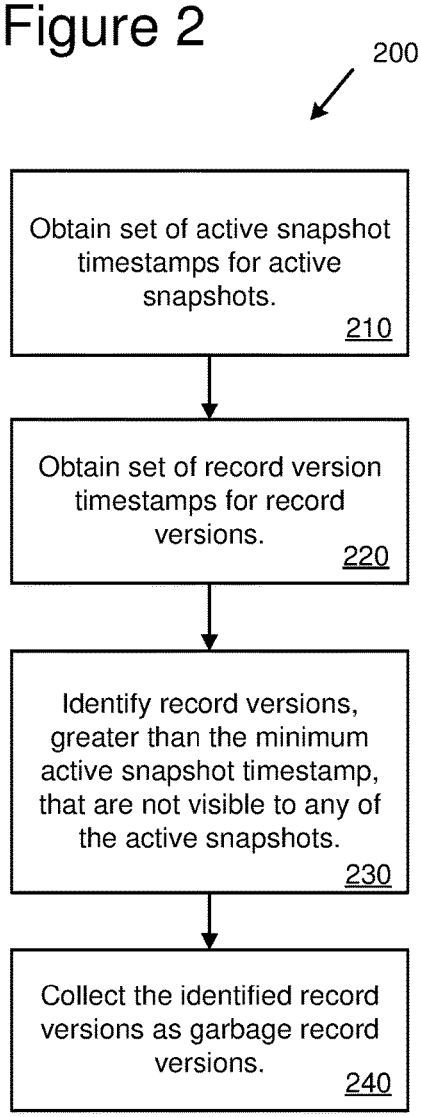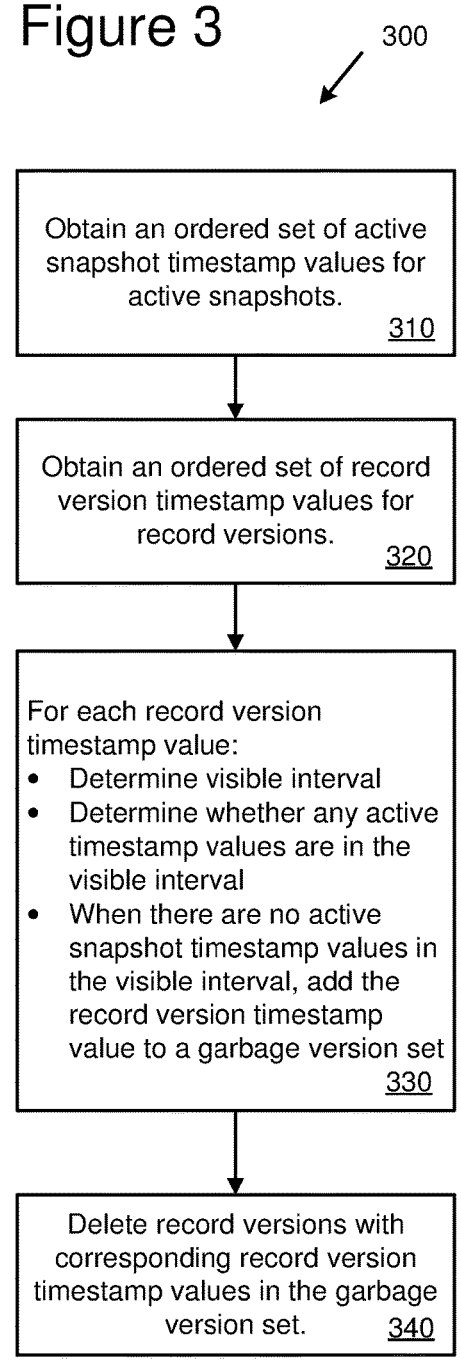

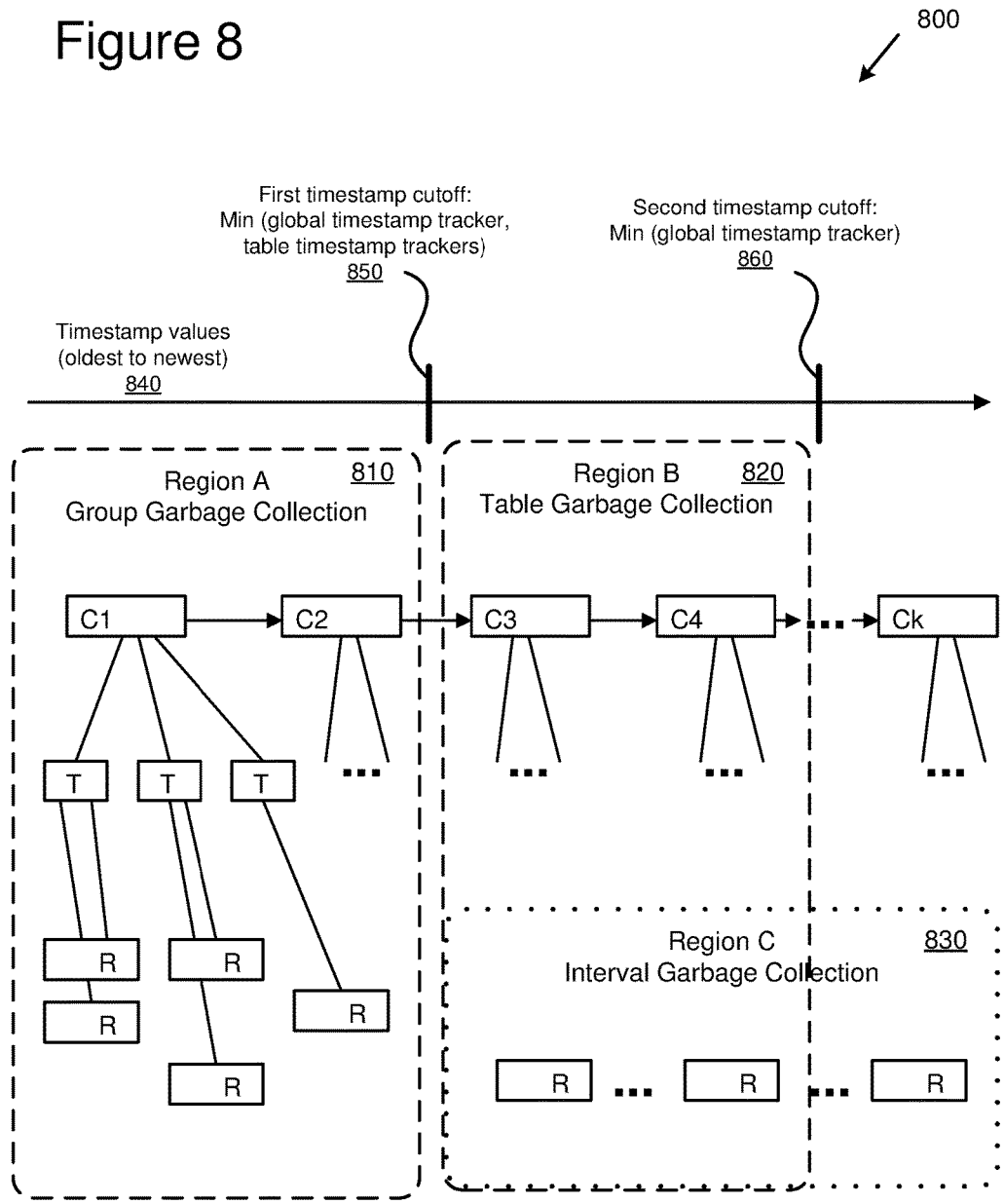

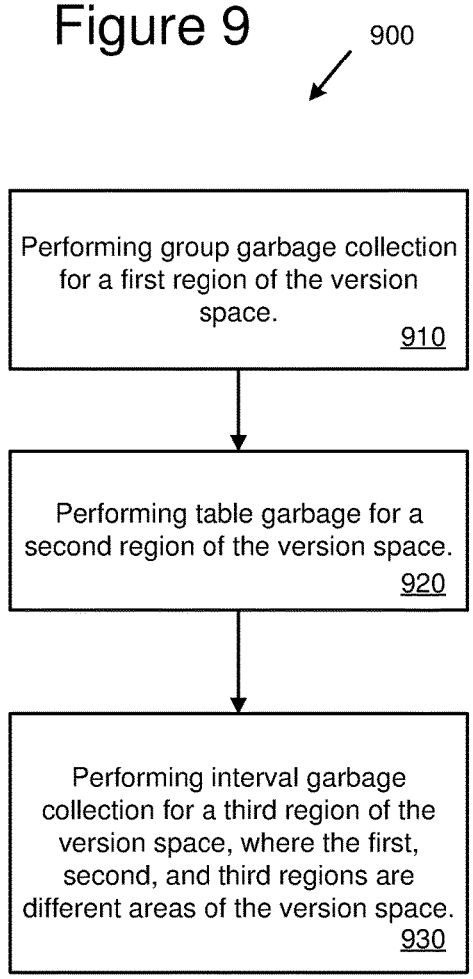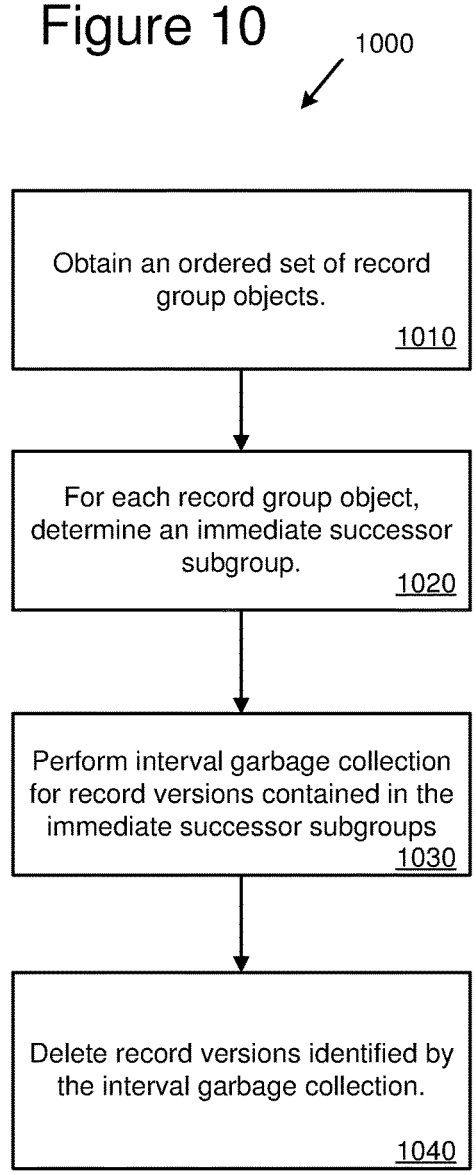

INTERVAL GARBAGE COLLECTION FOR MULTI-VERSION CONCURRENCY CONTROL IN DATABASE SYSTEMS

BACKGROUND

In a database management system, multi-version concurrency control (MVCC) can be used to provide concurrent access to the database by multiple users or applications. With MVCC, a database user that is reading data from the database can be provided a consistent view of the data (e.g., a snapshot) even while another user is writing to the database at the same time (e.g., during the first user's read transaction). In order to provide the consistent view, transactions in MVCC that update or delete data in a record create a new record version.

While MVCC systems support fast and robust performance, problems can still occur. For example, in an MVCC system with many transactions that update or delete data, the number of record versions that are created, and need to be maintained, can grow quite large over time. Existing garbage collection techniques can be used to remove record versions that are obsolete, but existing garbage collection techniques have a number of problems. For example, existing garbage collection techniques that rely on a global minimum timestamp value only remove record versions that are lower than the global minimum timestamp value. As a result, many obsolete versions may remain uncollected, which can lead to increased usage of computing resources including memory and processor time.

Therefore, there exists ample opportunity for improvement in technologies related to garbage collection in MVCC database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for performing garbage collection in database environments that use multi-version concurrency control (MVCC). For example, interval garbage collection, group garbage collection, table garbage collection, and hybrid garbage collection techniques can be applied separately or in combination.

With interval garbage collection, record versions that are not visible to any active snapshots are collected. For example, interval garbage collection can be performed by comparing a set of active snapshot timestamps and a set of record version timestamps to determine which record versions are not visible to any active snapshots. The record versions that are not visible to any active snapshots can be deleted.

With group garbage collection, record versions are more efficiently collected as garbage on the basis of a group (e.g., a record group object or group commit context). For example, a group object can group a number of record versions that have the same timestamp value. Group garbage collection can then be performed to collect the record versions of an entire group at a time or multiple groups at a time. For example, record groups can be identified for garbage collection by comparing their timestamp values to a global minimum timestamp.

With hybrid garbage collection, multiple garbage collection techniques are applied in combination. In some implementations, hybrid garbage collection involves a combination of group garbage collection and interval garbage collection. In this type of hybrid garbage collection, intermediate record versions can be collected in addition to record versions collected by record group For example, intermediate record versions can be organized into immediate successor subgroups within the record groups and collected using interval garbage collection techniques.

In some implementations, hybrid garbage collection involves a combination of group garbage collection, table garbage collection, and interval garbage collection. In this type of hybrid garbage collection, the version space can be divided into three different regions and the individual techniques can be applied to their respective regions.

BRIEF DESCRIPTION OF THE DRAWINGS

FIG. 1 is a diagram depicting example garbage collection techniques for record versions.

FIG. 2 is a flowchart of an example method for performing interval garbage collection in a database environment.

FIG. 3 is a flowchart of an example method for performing interval garbage collection in a database environment using visible intervals.

FIG. 8 is a diagram depicting an example hybrid garbage collection technique that uses group garbage collection, table garbage collection, and interval garbage collection.

FIG. 9 is a flowchart of an example method for performing hybrid garbage collection in a database environment using group garbage collection, table garbage collection, and interval garbage collection.

FIG. 10 is a flowchart of an example method for performing hybrid garbage collection in a database environment using group garbage collection and interval garbage collection.

DETAILED DESCRIPTION

Example 1—Overview

Figure 4:
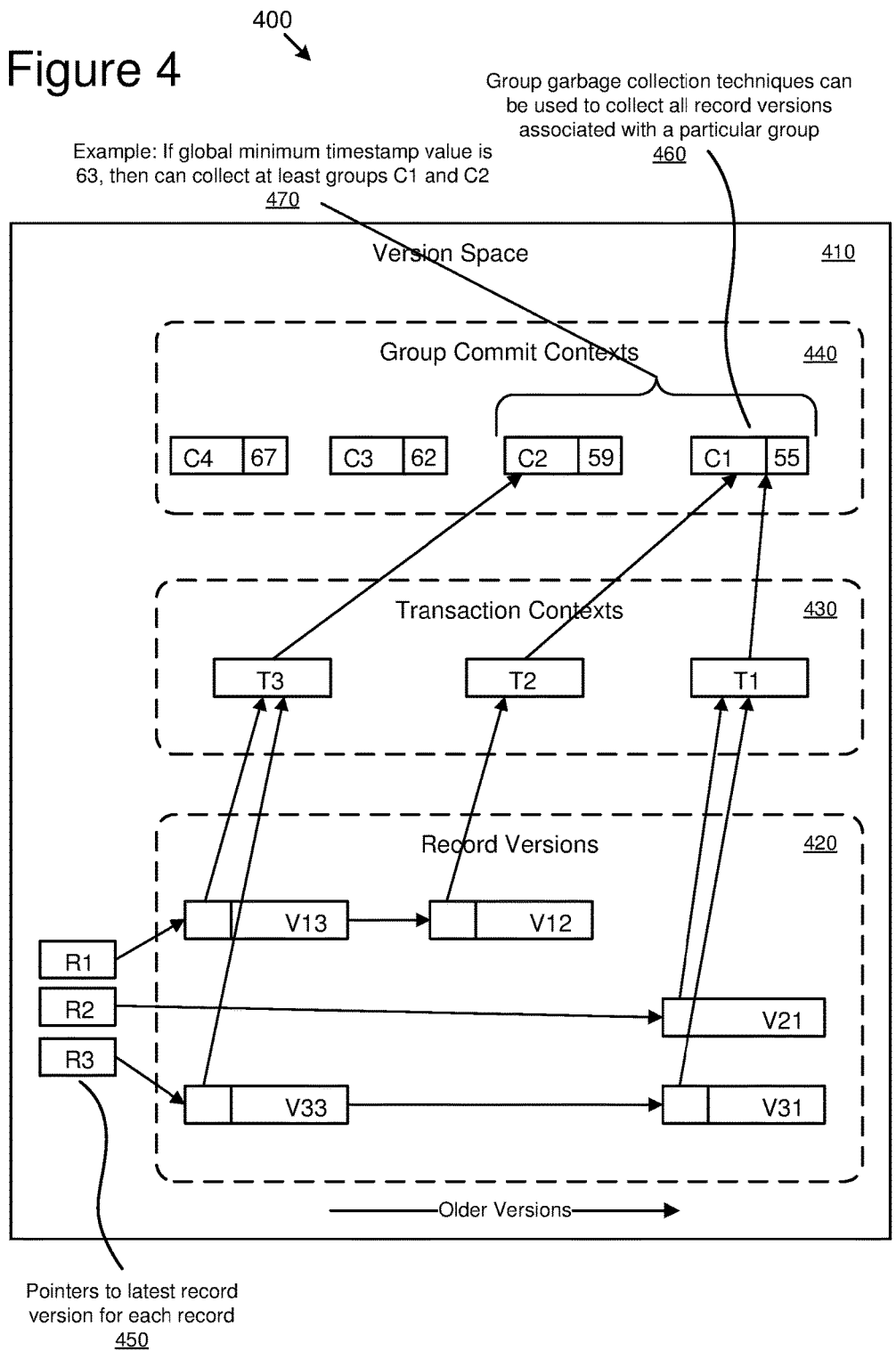
FIG. 4 is a diagram depicting example group garbage collection techniques for record versions.

The following description is directed to technologies for performing garbage collection (also called version consolidation) in database systems, such as MVCC database systems. For example, different garbage collection techniques can be used separately or in various combinations, including interval garbage collection, group garbage collection, table garbage collection, and combinations. For example, a particular type of combination uses technique from interval, group, and table garbage collection.

Commercial database management systems (DBMSs), such as the SAP HANA® database (SAP HANA is a database platform provided by SAP®) employ multi-version concurrency control (MVCC) due to the fast and robust performance provided for various workloads. In MVCC, updates (including deletes) by a transaction to a record generate new versions (record versions) rather than updating the existing record in place, and therefore a series of record versions are maintained for each record.

In a database environment supporting MVCC, snapshot isolation is provided to support transaction consistency. A "snapshot" refers to a view of the database system, or at least a portion thereof, as it existed at the time of the snapshot. For example, a query started under a particular snapshot would have available to it records as they existed at the time of the snapshot. The query would not see, for example, changes that were made to the records after the snapshot was acquired. Snapshot isolation provides that all read operations in a transaction will see a consistent version, or snapshot, of the relevant database records.

At least some database environments of the present disclosure can provide one or both of two variants of snapshot isolation, statement-level snapshot isolation (SSI) and transaction-level snapshot isolation (TSI). In SSI, each statement has its own snapshot associated with a new snapshot timestamp, and all reads logically occur at the beginning of the statement. In TSI, each transaction has its own snapshot with a new snapshot timestamp, and all reads logically occur at the beginning of the transaction. Typically, in SSI and TSI, a snapshot timestamp is assigned to a new snapshot when the new snapshot starts. Under SSI, each statement has its own snapshot, while each transaction has its own snapshot under TSI.

In some aspects of the present disclosure, a database environment implementing MVCC includes a table having database records. A new version of a record is created on each update operation instead of overriding the existing record version. Even for record deletion operations, a new version header is typically created with an empty payload instead of deleting the existing record right away. When creating a new record version, a versioning token, such as a version timestamp, representing the version creation time, is stored (e.g., in a version header). In a particular implementation, the version timestamp is derived from a global synchronization token, such as a transaction commit timestamp, maintained by a central transaction manager which will be incremented on each commit of a write transaction. According to a particular example, the versions of a particular record are chained to each other in a sorted order, such as by their version timestamps. Older versions of the particular record in the version chain can be garbage-collected when specified criteria are met, such as when it is determined that there is no potential reader in the system for that record version. When a record version is identified for garbage collection, it can be deleted, collected, or otherwise removed from the version space.

While MVCC supports fast and robust performance, a potential problem can occur due to the growing number of record versions that may accumulate over time. For example, if obsolete versions cannot be deleted, they can accumulate to the point at which performance of the database system is compromised (e.g., limited available memory or increased processing resources needed to manage the versions).

In a typical existing garbage collection technique for MVCC database systems, record versions are identified as candidates for garbage collection if their version timestamps are lower than a single minimum value (called a global minimum timestamp) of snapshot timestamps of active snapshots in the system. The candidates, except for the most recent one, can be safely reclaimed as garbage versions because they are not visible to any active snapshots.

However, the typical existing garbage collection technique may not effectively reclaim record versions, particularly in mixed online transaction processing (OLTP) and online analytical processing (OLAP) workload situations. With these workloads, OLTP applications generate a high volume of new versions, while long-lived queries (under SSI) or transactions (under TSI) in OLAP applications often block garbage collection because the version timestamp of each record version needs to be compared with the snapshot timestamp of the oldest, long-lived timestamp. Therefore, these workloads can result in increased use of memory to store the growing version chains and increased use of processing resources to traverse and manage the version chains. For example, a long duration transaction (e.g., that remains open for a number of minutes or hours) can block garbage collection for many record versions that are no longer needed.

FIG. 1 is a diagram 100 depicting example garbage collection techniques for record versions in an MVCC database environment. In the diagram 100, a number of active snapshots are depicted at 110 along with their snapshot timestamps. Specifically, four active snapshots are depicted, with associated timestamps of 3, 100, 105, and 110, respectively. For example, the first active snapshot (with a snapshot timestamp of 3) is associated with one or more transactions, statements, and/or queries each having the timestamp value of 3 (reflecting when the transaction, statement, or query started). The remaining active snapshots are also associated with one or more respective transactions, statements, and/or queries. As depicted at 120, the global minimum timestamp value is 3 (the minimum of the active snapshot timestamps).

Also depicted in the diagram 100 is a version space 130 with a number of versions of a particular database record, identified as record 1. Specifically, five versions of the record are depicted, which are labeled version 11 through version 15. Each record version is associated with a record version timestamp (reflecting when the record version was committed). For example, record version 15 is associated with a record version timestamp value of 99, as depicted at 132.

With reference to FIG. 1, a typical existing garbage collection technique involves comparing the global minimum timestamp value of 3 (depicted at 120) with the record version timestamp values in the version space (depicted at 130). Therefore, the typical existing garbage collection technique identifies only record version 11 as garbage (as depicted at 134) because its record timestamp value of 1 is less than the global minimum timestamp value of 3. Record version 12, with a record timestamp value of 2, is also less than the global minimum timestamp value, but it is not identified for garbage collection is it is the only version less than the earliest active snapshot (i.e., it may be relied upon by the active snapshot with a snapshot timestamp value of 3).

However, there are record versions in the version space (depicted at 130) that are not visible to any active transaction represented in the active snapshots (depicted at 110). Specifically, record version 13 (with a record version timestamp value of 4) and record version 14 (with a record version timestamp value of 5) are not visible to any active transaction. Therefore, as depicted at 136, the garbage collection technologies described herein (including interval garbage collection) can identify record versions 13 and 14 for garbage collection.

In order to address the limitations of the existing garbage collection techniques, the technologies described herein provide for more effective and/or efficient garbage collection of record versions in database environments (e.g., in database systems that use MVCC).

One improvement in garbage collection techniques is interval garbage collection. With interval garbage collection, record versions are more effectively identified as garbage. In contrast to garbage collection that relies on a single global minimum timestamp value, interval garbage collection involves the identification of intermediate record versions (record versions other than those less than a global minimum timestamp value) that are no longer used and can therefore be collected as garbage versions and deleted. Interval garbage collection can use visible intervals to identify record versions that are no longer used (e.g., that are not visible to any active snapshots).

Interval garbage collection provides advantages in terms of memory and computing resource usage. For example, use of computer memory and storage can be reduced by collecting record versions that are no longer needed. Furthermore, by reducing the number of record versions in the version space, computing processes that utilize the version space operate more efficiently (e.g., by having fewer record versions to traverse to find a record version of interest) resulting in reduced usage of processor cycles, memory, storage, etc.

Another improvement in garbage collection techniques is group garbage collection. With group garbage collection, record versions are more efficiently collected as garbage on the basis of a group (e.g., a record group object or group commit context). For example, a group object can group a number of record versions that have the same timestamp value (e.g., called a group commit timestamp). In some implementations, the group object contains transactions and their associated record versions that have the same timestamp value. Group garbage collection can then be performed to collect the record versions of an entire group at a time or multiple groups at a time. For example, record groups can be identified for garbage collection by comparing their timestamp values to a global minimum timestamp.

Group garbage collection provides advantages in terms of memory and computing resource usage. For example, by using group garbage collection, entire groups of record versions can be collected at once without having to traverse each record version, thus saving processor time and memory that would otherwise be needed to process each record version individually.

Another improvement in garbage collection techniques is hybrid garbage collection. With hybrid garbage collection, multiple garbage collection techniques are applied in combination. In some implementations, hybrid garbage collection involves a combination of group garbage collection and interval garbage collection. In this type of hybrid garbage collection, intermediate record versions can be collected in addition to record versions collected by record group (e.g., associated with a timestamp value less than a minimum snapshot timestamp). For example, intermediate record versions can be organized into immediate successor subgroups within the record groups and collected using interval garbage collection techniques.

In some implementations, hybrid garbage collection involves a combination of group garbage collection, table garbage collection, and interval garbage collection. In this type of hybrid garbage collection, the version space can be divided into three different regions and the individual techniques can be applied to their respective regions. In some implementations, the regions are defined by two timestamp cutoff values.

The hybrid garbage collection approaches can provide efficiency in terms of computing resources used. For example, hybrid garbage collection can apply the technique that is most efficient for a given region of the version space thus reducing the computing resources needed to perform garbage collection. Hybrid garbage collection can also collect more record versions that could otherwise be accomplished with an individual technique, which can result in decreased computing resource usage (e.g., memory or storage needed to maintain the chains of record versions).

The technologies described herein can be applied to an in-memory database management system (DBMS), such as the SAP HANA database. The in-memory database management system can store the row store and the column store in memory. In some implementations, all data is resident in memory. In other implementations, only a portion of the data is resident in memory (e.g., frequently used and/or important data.

Example 2—Interval Garbage Collection Techniques

In any of the examples herein, interval garbage collection techniques can be applied to more effectively identify record versions as garbage (e.g., as record versions which are no visible to any active snapshots and can therefore be collected or deleted). In contrast to garbage collection that relies on a single global minimum timestamp value, interval garbage collection involves the identification of intermediate record versions (record versions other than those less than a global minimum timestamp value) that are no longer used and can therefore be collected as garbage versions and deleted (e.g., removed from the version space).

In some implementations, interval garbage collection uses visible intervals among consecutive timestamps of record versions (e.g., between each consecutive pair of record versions). The visible interval [s, e) for a record v is a range from which a set of snapshot timestamps to which v is visible can be determined. The notation [s, e) means >=s and <e. With reference to FIG. 1, the visible intervals for record 1 in the version space (depicted at 130) are {[1, 2), [2, 4), [4, 5), [5, 99), [99, ∞)}. From the visible intervals, it can be determined that there are two record versions that are not visible to any active snapshots. Specifically, version 13, with a visible interval of [4, 5), is invisible to any active snapshot and can be reclaimed as garbage because there is no active snapshot timestamp within the visible interval range of 4 through 4. Similarly, version 14, with a visible interval of [5, 99), is invisible to any active snapshot and can be reclaimed as garbage because there is no active snapshot timestamp within the visible interval range of 5 through 98.

FIG. 2 is a flowchart of an example method 200 for performing interval garbage collection in a database environment using multi-version concurrency control. The example method 200 can be performed, at least in part, by a computing device (e.g., by computing devices operating a database management system).

At 210, a set of active snapshot timestamps is obtained for corresponding active snapshots in the database environment. The set of active snapshots can be represented by an ordered set of integer timestamp values.

At 220, a set of record version timestamps is obtained for corresponding record versions associated with a record in the database environment. The set of record version timestamps can be represented by an ordered set of integer timestamp values.

At 230, record versions are identified that are not visible to any of the active snapshots. In some implementations, only those record versions that are greater than the minimum active snapshot timestamp (in the set of active snapshot timestamps) are identified (e.g., because record versions less than the minimum can be garbage collected using a global minimum timestamp value). The record versions are identified using the set of active snapshot timestamps obtained at 210 and the set of record version timestamps obtained at 220.

At 240, the record versions identified at 230 are collected as garbage record versions. The garbage record versions can be deleted, reclaimed, or otherwise removed from the version store.

In some implementations, the example method 200 performs interval garbage collection without using a global minimum timestamp value. In other implementations, a combined approach can be applied where record versions with timestamps less than the global minimum timestamp value can be collected using one approach (e.g., an existing garbage collection technique) while the record versions with timestamps greater than the global minimum timestamp value (or greater than the minimum active snapshot timestamp) can be collected using the interval garbage collection techniques described herein.

In some implementations, the record versions that are not visible to any of the set of active snapshots are identified using visible intervals. For example, a visible interval for a record version can be determined. The visible interval is from the record version timestamp for the record version up to, but not including, the next record version timestamp. For example, if the set of record versions timestamps is [15, 21, 22, 36, 54], then the visible interval for record version timestamp 22 would be [22, 36). Using the visible interval, the active snapshots can be checked to determine whether any are within the visible interval. In the example visible interval [22, 36), any active snapshots with timestamp values greater than or equal to 22 and less than 36 (i.e., less than or equal to 35) would be within the visible interval. If there are no active snapshots within the visible interval, then the record version can be collected as a garbage version. This procedure can be performed for one or more of the record versions (e.g., for each record version) in the set of record version timestamps. As an example, a record version may have a visible interval of timestamp 20 up to timestamp 38 (e.g., >=20 and <38). If an active snapshot has a timestamp of 25, then the record version would be visible to the active snapshot and the record version would not be collected. However, if there are no active snapshots within the visible interval (e.g., >=20 and <38), then the record version would be collected.

FIG. 3 is a flowchart of an example method 300 for performing interval garbage collection using visible intervals in a database environment using multi-version concurrency control. The example method 300 can be performed, at least in part, by a computing device (e.g., by computing devices operating a database management system).

At 310, an ordered set of active snapshot timestamp values is obtained for corresponding active snapshots in the database environment. The set of active snapshot timestamp values can be represented by an ordered set of integer timestamp values.

At 320, a set of record version timestamp values is obtained for corresponding record versions associated with a record in the database environment. The set of record version timestamp values can be represented by an ordered set of integer timestamp values.

At 330, a number of operations are performed for each record version timestamp value in the ordered set of record version timestamp values. First, a visible interval is determined for the record version timestamp value. The visible interval is from the record version timestamp value up to, but not including, a next greater record version timestamp value in the ordered set of record version timestamp values. Second, a determination is made as to whether any active timestamp values are within the visible interval. Third, when there are no active snapshot timestamp values within the visible interval, the record version timestamp value is added to a garbage version set for garbage collection. Otherwise, if there are active snapshot timestamp values within the visible interval, the record version timestamp value is not added to the garbage version set.

At 340, the record versions with corresponding record version timestamp value entries in the garbage version set are deleted.

In some implementations, interval garbage collection is performed using a consecutive interval intersection solution that utilizes visible intervals. Specifically, the consecutive interval intersection is defined as follows: given two ordered sequences of integers, S and T, find the subset $T \cap$ satisfying Equation 1 below.

$$T \cap = \{t | t \in T, \text{LGN}(t+1,T) \leq \text{LGN}(t,S)\} \quad \text{(Equation 1)}$$

With regards to Equation 1, consider an integer t and an ordered sequence S of integers. Assume that S always contains a number which is larger than or equal to any t. The least greater number (LGN) for t with respect to S is defined as the smallest number in S such that the number is greater than or equal to t. The least greater number is designated as LGN(t, S). As an example, suppose that t=10 and S=[1, 4, 6, 8, 12, 14]. Then, LGN(t, S)=min {12, 14}=12. If t=15, LGN(t, S)=∞.

For example, consider example sets S=[90, 92, 95, 96, 99] and T=[91, 93, 94, 95, 98]. By applying Equation 1, LGN(t+1, T) and LGN(t, S) can be computed for each t. Finally, $T \cap$ can be computed, resulting in $T \cap = \{93, 94\}$.

Applying Equation 1 to garbage collection, S is an ordered sequence of snapshot timestamps and T is an ordered sequence of record version timestamps for a record. Therefore, Equation 1 can be used to identify the elements in $T \cap$ as garbage versions. The definition for the visible interval for t is [t, LGN(t+1, T)).

$T \cap$ can be calculated using nested loops. When using nested loops, for each record version t, a set intersection operation is performed for every snapshot timestamp in S. The time complexity of an implementation using nested loops is $O(|T| \times |S|)$.

$T \cap$ can also be calculated using an improved implementation that is more efficient. In the improved implementation, in order to minimize garbage collection overhead, a merge-based solution is used. Algorithm 1 below defines the merge-based garbage collector for interval garbage collection. The algorithm computes $T \cap$ in Equation 1 with time complexity $O(|T|+|S|)$. In the algorithm, the i-th element of T is denoted by T[i]. In order to merge two ordered sequences, two index variables are maintained, i and j. For each element T[i], j is moved until S[j]>=T[i] (lines 3-4). Then, S[j] should be LGN(T[i], S). If S[j]>=T[i+1], then T[i]

is identified as garbage. Otherwise, T[i] is skipped by incrementing i because it is not garbage.

---

Algorithm 1

Input: Two ordered sequences of integers S, T
Output: T∩
1: i ← 0, j ← 0
2: while i < |T| − 1 do
3:    if S[j] < T[i] then
4:        j ← j + 1
5:    else if T[i + 1] <= S[j] then /* T[i + 1] represents LGN(T[i] + 1, T) */
6:        T∩ ← T∩ ∪ T[i]
7:        i ← i + 1
8:    else
9:        i ← i + 1
10:   end if
11: end while
12: return T∩

---

Algorithm 1 can be applied to the example snapshots and record versions depicted in FIG. 1. The values for S would be snapshot timestamps (depicted at 110) [3, 100, 105, 110] and the values for T would be the record version timestamps (depicted at 130) [1, 2, 4, 5, 99]. After applying Algorithm 1, T∩ would be returned as {4, 5}, indicating that record versions 13 and 14 can be deleted as garbage versions.

Example 3—Group Garbage Collection Techniques

In any of the examples herein, group garbage collection techniques can be applied to more efficiently identify record versions as garbage and collect them. For example, with group garbage collection, record versions can be associated with a logical group at version creation time. Then, when performing garbage collection, the logical groups of associated record versions can be leveraged to perform group garbage collection for an entire group at a time (e.g., instead of, or in addition to, garbage collection on a record-by-record basis). In some implementations, a single operation can be used to collect all of the record versions in a particular group.

FIG. 4 is a diagram 400 depicting example group garbage collection techniques for record versions in an MVCC database environment. In the diagram 400, a version space of the database environment is depicted at 410. The version space contains example record versions, depicted at 420, for three example records. Specifically, record 1 (labeled R1) is associated with two record versions, version 13 (labeled V13) and version 12 (labeled V12). Record 2 is associated with one record version, which is version 21 (labeled V21). Record 3 is associated with two record versions, version 33 (labeled V33) and version 31 (labeled V31). The record versions are organized from most recent first (i.e., with the most recent record version on the left). In some implementations, the version space 410 maintains a list of pointers to the latest record version for each record, as depicted at 450.

The version space also stores transaction contexts (also called transaction objects), which are depicted at 430. Specifically, three example transactions are depicted in the transaction context area. Transaction 1 (labeled T1), which corresponds to a single transaction, created record versions 21 (for record 2) and 31 (for record 3), and this association is reflected in the arrows from record versions 21 and 31 to transaction 1. Because transaction 1 created record versions 21 and 31, record versions 21 and 31 will have the same record version timestamp value as transaction 1, which is the commit timestamp when transaction 1 was committed. In addition, because transaction 1 created record versions 21 and 31, record versions 21 and 31 are logically grouped together and associated with transaction 1. In some implementations, record version timestamps are maintained at the transaction context, which can be more efficient (e.g., a process accessing the timestamps can access the transaction context without having to access the record version, or multiple record versions, directly). For example, record versions 21 and 31 can store pointers to the transaction context T1 for transaction 1. Transaction 2 (labeled T2) created record version 12 (for record 1), and record version 12 is associated with transaction 2. Transaction 3 (labeled T3) created record versions 13 (for record 1) and 33 (for record 3), and record versions 13 and 33 are logically grouped together and associated with transaction 3.

The version space also stores group commit contexts (also called record group objects or record groups), which are depicted at 440. For example, in the database system if there are multiple transactions running concurrently, they can be grouped and committed together (e.g., via a single commit operation) and associated with a single group commit context with the same commit timestamp value. Here, transaction 1 and transaction 2 were committed together and associated with group commit context 1 (labeled C1). Therefore, transaction 1 and transaction 2, as well as associated record versions 12, 21, and 31, all have the same record version timestamp value, which is the commit timestamp when group commit context 1 was committed (in this example, the timestamp value is 55). Transaction 3 was committed separately, as a single transaction, and associated with group commit context 2 (labeled C2). Therefore, transaction 3, as well as associated record versions 13 and 33, all have the same record version timestamp value, which is the commit timestamp when group commit context 2 was committed (in this example, the timestamp value is 59). In some implementations, the timestamp value is stored only once at the group commit context level, with the associated record versions and transactions pointing to their associated group commit context.

Group garbage collection techniques can be applied to collect record versions for an entire group at once. For example, the record versions 12, 21, and 31, associated with group commit context 1, can be collected together, as depicted at 460. In some implementations, determining whether a particular group commit context can be collected involves comparing the timestamp value for the group commit context to a minimum snapshot timestamp value (e.g., a global minimum timestamp value for active snapshots, which can be maintained by a global snapshot timestamp tracker). If the group commit context timestamp value is less than the minimum snapshot timestamp value, then all record versions of the group commit context can be collected. In some implementations, a particular group can be collected if its timestamp value is less than the minimum timestamp value and there exists another group commit context with a later timestamp value that is also less than the minimum timestamp value. For example, as depicted at 470, if the global minimum timestamp value is 63, then the record versions associated with groups C1 and C2 can be collected.

Figure 5:
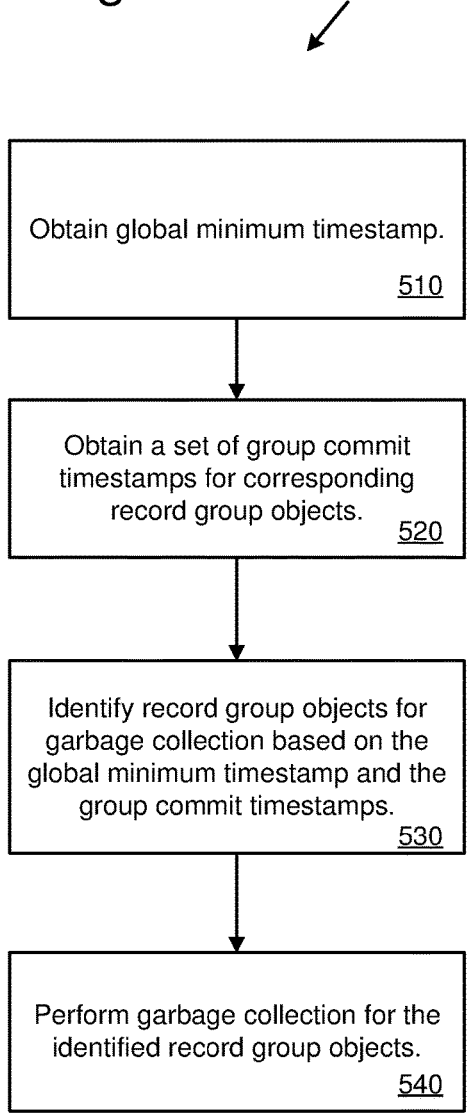
FIG. 5 is a flowchart of an example method for performing group garbage collection in a database environment.

FIG. 5 is a flowchart of an example method 500 for performing group garbage collection in a database environment using multi-version concurrency control. The example method 500 can be performed, at least in part, by a computing device (e.g., by computing devices operating a database management system).

At 510, a global minimum timestamp is obtained. For example, the global minimum timestamp (also called a global minimum snapshot timestamp) can be the minimum timestamp value among active snapshot timestamps in the database environment.

At 520, a set of group commit timestamps is obtained for corresponding record group objects (also called group commit contexts). Each record group object supports grouping of a plurality of record versions. In some implementations, each record group object is associated with one or more transaction objects (also called transaction contexts), and each transaction object is associated with one or more record versions.

At 530, one or more of the record group objects are identified for garbage collection based on the global minimum timestamp and the set of group commit timestamps. For example, record group objects with timestamp values less than the global minimum timestamp can be eligible for garbage collection. In some implementations, the record group objects with timestamp values less than the global minimum timestamp, except for a most recent record group object, are identified for garbage collection.

At 540, garbage collection is performed for the identified record group objects. Garbage collection involves deleting the record versions associated with the identified record group objects. In some implementations, garbage collection also involves deleting the transaction objects associated with the identified record group objects and/or deleting the record group objects themselves.

Figure 6:
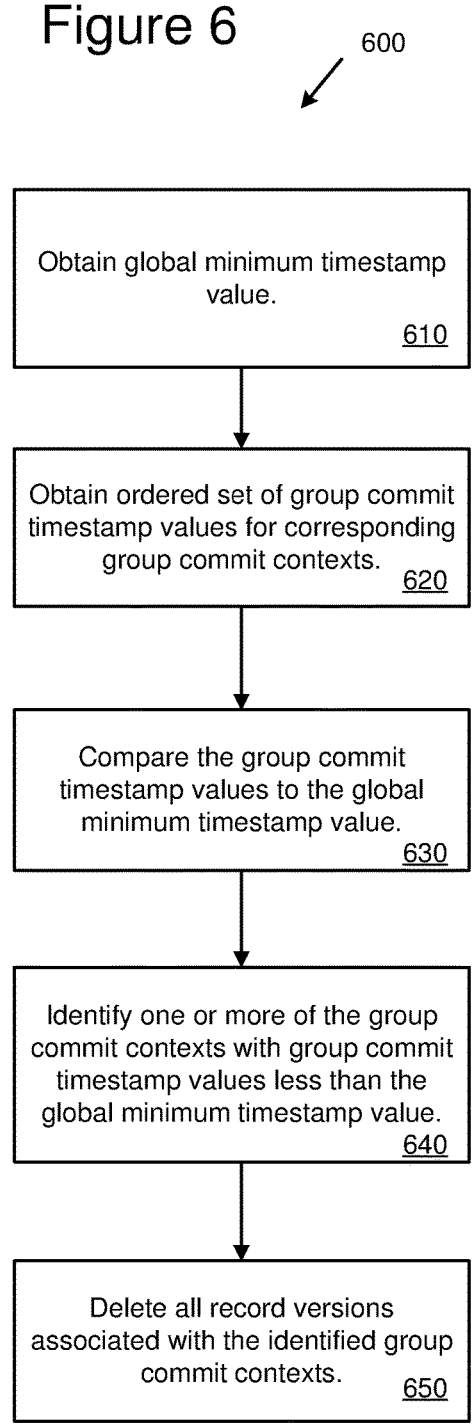
FIG. 6 is a flowchart of an example method for performing group garbage collection in a database environment using group commit contexts.

FIG. 6 is a flowchart of an example method 600 for performing group garbage collection in a database environment using multi-version concurrency control. The example method 600 can be performed, at least in part, by a computing device (e.g., by computing devices operating a database management system).

At 610, a global minimum timestamp value is obtained. For example, the global minimum timestamp value (also called a global minimum snapshot timestamp value) can be the minimum timestamp value among active snapshots in the database environment.

At 620, an ordered set of group commit timestamp values is obtained for corresponding group commit contexts. Each group commit context supports grouping of a plurality of record versions. In some implementations, each group commit context is associated with one or more transaction contexts, and each transaction context is associated with one or more record versions.

At 630, the group commit timestamp values are compared to the global minimum timestamp value. For example, the group commit timestamp values can be traversed, beginning with the oldest group commit timestamp value, until a group commit timestamp value is reached that is greater than (or greater than or equal to) the global minimum timestamp value.

At 640, one or more of the group commit contexts with group commit timestamp values less than the global minimum timestamp value are identified. In some implementations, the group commit contexts with timestamp values less than the global minimum timestamp value, except for a most recent group commit context with a timestamp value less than the global minimum timestamp value, are identified for garbage collection At 650, all record versions associated with the identified group commit contexts are deleted. In some implementations, the transaction contexts and/or the group commit contexts themselves are also deleted.

Example 4—Hybrid Garbage Collection Techniques

In any of the examples herein, hybrid garbage collection techniques can be applied to more efficiently identify record versions as garbage and collect them. With hybrid garbage collection, multiple garbage collection techniques are applied in combination. For example, hybrid garbage collection can include techniques that apply group garbage collection and interval garbage collection in combination. Hybrid garbage collection can also include techniques that apply group garbage collection, table garbage collection, and interval garbage collection in combination.

In a first type of hybrid garbage collection, group garbage collection techniques are used in combination with interval garbage collection techniques. In this type of hybrid garbage collection, intermediate record versions can be collected in addition to record versions collected by record group (e.g., associated with a timestamp value less than a global minimum snapshot timestamp).

Figure 7:
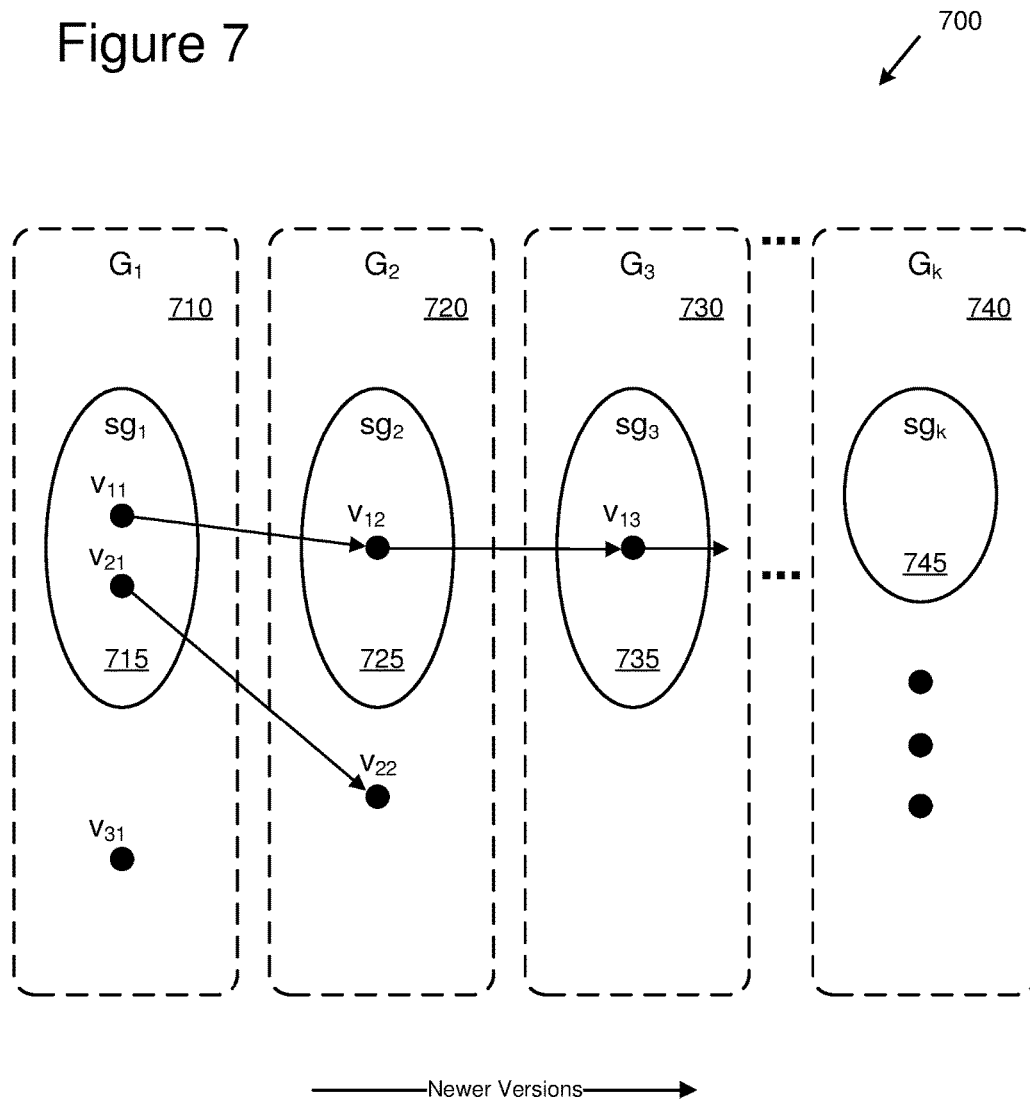
FIG. 7 is a diagram depicting an example hybrid garbage collection technique that uses group garbage collection and interval garbage collection.

FIG. 7 is a diagram 700 depicting an example hybrid garbage collection technique that uses group garbage collection and interval garbage collection. In the diagram 700, a number of record groups are depicted (also called group commit contexts), labeled $G_1$ 710, $G_2$ 720, $G_3$ 730, and $G_k$ 740. Each record group groups record versions (e.g., along with their associated transaction objects) that were committed together and therefore have the same timestamp value.

The first type of hybrid garbage collection uses the concept of an immediate successor subgroup. An immediate successor subgroup in a group $G_i$ contains record versions in $G_i$ that have an immediate successor in the next group $G_{i+1}$. In FIG. 7, the immediate successor subgroups, 715, 725, 735, and 745, are labeled $sg_i$. Specifically, the immediate successor subgroup for group $G_1$ is labeled $sg_1$ 715, the immediate successor subgroup for group $G_2$ is labeled $sg_2$ 725, and so on. In group $G_1$, the immediate successor subgroup $sg_1$ contains record versions 11 and 21 (labeled $v_{11}$ and $v_{12}$ in the figure) because both record versions 11 and 21 have immediate successor record versions (record versions 12 and 22) in the next group $G_2$ 720. However, record version 31 in group $G_1$ 710 is not in the immediate successor subgroup $sg_1$ 715 because record version 31 does not have an immediate successor record version in the next group $G_2$ 720. In group $G_2$ 720, the immediate successor subgroup $sg_2$ 725 contains record version 12 because it has an immediate successor record versions (record versions 13) in the next group $G_3$ 730. However, record version 22 in group $G_2$ 720 is not in the immediate successor subgroup $sg_2$ 725 because record version 22 does not have an immediate successor record version in the next group $G_3$ 730. In the final group $G_k$ 740 (the most recent group with the most recent timestamp value) does not have any record versions in its immediate successor subgroup because it is the final group (there are no newer groups).

In the first type of hybrid garbage collection, interval garbage collection is applied to the ordered sequence of immediate successor subgroups. For example, interval garbage collection can be applied to the immediate successor groups 715, 725, 735, through 745. In some implementations, interval garbage collection is performed for the versions of each record in the immediate successor subgroups. For example, interval garbage collection can be performed for the record versions 11, 12, and 13 for record 1 in the immediate successor subgroups 715, 725, and 735 according to the interval garbage collection techniques described herein (e.g., using techniques described with regard to the example record in the version space 130 of FIG. 1).

In some implementations, the first type of hybrid garbage collection involves performing group garbage collection for record groups with timestamp values less than a global minimum timestamp value and interval garbage collection for immediate successor subgroups in record groups with timestamp values greater than or equal to the global minimum timestamp value.

In a second type of hybrid garbage collection, group garbage collection, table garbage collection, and interval garbage collection are used in a combined approach. The combined approach can provide efficiency in terms of computing resources used. For example, while interval garbage collection could be used throughout the version space, interval garbage collection is more expensive in terms of computing resources (e.g., due to usage of two ordered sets of timestamp values and analysis on the basis of individual record versions). Therefore, the combined approach can utilize the appropriate garbage collection technique where it is most efficient and/or effective to do so.

For example, the version space of record versions, which can include transaction objects and/or record group objects as well, can be divided into three regions. For a first region, group garbage collection is applied. For a second region, table garbage collection is applied. For a third region interval garbage collection is applied. In some implementations, the second and third regions overlap.

In the second type of hybrid garbage collection, a second timestamp tracker is used in addition to the global minimum snapshot timestamp tracker. The second timestamp tracker is used to track timestamp values for individual tables (e.g., implemented as a separate tracker for each table), and is used for table garbage collection. With table garbage collection, record versions associated with particular tables can be collected by referring to the second timestamp tracker. In some implementations, table garbage collection involves the following steps: (1) determine whether there are any long-lived snapshots (e.g., based on a threshold value), (2) move snapshot timestamp objects from the global timestamp tracker to the second timestamp tracker (e.g., to specific table timestamp trackers associated with individual tables), and (3) reclaim record versions by traversing the version space based on the per-table minimum snapshot timestamps (e.g., a particular record version timestamp is compared with its table's minimum snapshot timestamp and is collected if its record version timestamp is less than its table's minimum snapshot timestamp). In some implementations, a separate snapshot timestamp tracker is maintained for each table.

FIG. 8 is a diagram 800 depicting an example hybrid garbage collection technique that uses group garbage collection, table garbage collection, and interval garbage collection. In the diagram 800, the version space for record versions is divided into three regions. The three regions are defined, in part, by their relation to a first timestamp cutoff 850. Region A 810 is the region of record groups (labeled C1 and C2 in this example), and their associated transactions and record versions (labeled "T" and "R," respectively), with timestamp values (e.g., group commit timestamp values) less than the first timestamp cutoff. The first timestamp cutoff 850 is defined as the minimum timestamp value among the global snapshot timestamp tracker (the global minimum timestamp value for active snapshots that do not reference particular tables) and the table snapshot timestamp trackers (the minimum timestamp value among the one or more timestamp trackers that track timestamp values for individual tables). For region A 810, group garbage collection is performed to collect record versions associated with the record groups in region A 810.

Region B 820 is the region of record groups, and their associated transactions and record versions, with timestamp values (e.g., group commit timestamp values) greater than the first timestamp cutoff 850 and less than the second timestamp cutoff 860. The second timestamp cutoff 860 is defined as the minimum timestamp value for the global snapshot timestamp tracker (the global minimum timestamp value for active snapshots that do not reference particular tables). For region B 820, table garbage collection is performed to collect record versions associated with the record groups in region B 820 using the table timestamp trackers.

Region C 830 is the region of record versions greater than the first timestamp cutoff 850. For region C 830, interval garbage collection is performed to collect record versions in region C 830 using record version timestamps and snapshot timestamps.

In some implementations, the set of record versions within region A 810 is reclaimed at once by the group garbage collector (also called the global group garbage collector). Region B 820 is inspected by the table garbage collector, while region C 830 is inspected by the interval garbage collector. While the interval garbage collector eventually scans all existing record version chains which are available in region C 830 when the interval garbage collector starts, the table garbage collector scans only a subset of the record group objects (those with commit timestamps greater than the first timestamp cutoff 850 and less than the minimum value of the global snapshot timestamp tracker, as indicated by the second timestamp cutoff 860). The group garbage collector and the interval garbage collector may need to operate in a slightly different manner when they are used together with the table garbage collector because the table garbage collector could move some snapshot timestamp values from the global snapshot timestamp tracker to the per-table snapshot timestamp trackers. For example, the group garbage collector needs to calculate its global minimum snapshot timestamp by considering not only the global snapshot timestamp tracker but also the per-table snapshot timestamp trackers (as reflected by the first timestamp cutoff 850). The interval garbage collector also needs to consider the per-table snapshot timestamp trackers as well as the global snapshot timestamp tracker. To deal with the situation where there are too many per-table snapshot timestamp trackers, the union of the global snapshot timestamp tracker and the per-table snapshot timestamp trackers can be maintained separately so that the minimum value can be quickly obtained.

In some implementations, the individual garbage collection techniques (group, table, and/or interval) are executed in parallel (e.g., as separate threads). For example, the record group object list, table identifiers, and/or record identifiers can be logically partitioned based on the first timestamp cutoff 850 and/or the second timestamp cutoff 860.

FIG. 9 is a flowchart of an example method 900 for performing hybrid garbage collection, including group garbage collection, table garbage collection, and interval garbage collection, in a database environment using multi-version concurrency control. The example method 900 can be performed, at least in part, by a computing device (e.g., by computing devices operating a database management system). In the example method 900, the version space is divided into three regions that cover different areas of the version space. In some implementations, the version space is divided into the three regions based on two timestamp cutoff values.

At 910, group garbage collection is performed for a first region of the version space. Group garbage collection involves deleting record versions associated with record group objects in the first region. In some implementations, the transaction objects and record group objects associated with the record versions are also deleted.

At 920, table garbage collection is performed for a second region of the version space. Table garbage collection involves deleting one or more record versions within the second region on a per-table basis. In some implementations, performing table garbage collection comprises deleting one or more record versions within the second region on a table-by-table basis based on a comparison using per-table minimum snapshot timestamps maintained by per-table snapshot trackers.

At 930, interval garbage collection is performed for a third region of the version space. Interval garbage collection involves deleting one or more record versions within the third region that are not visible to any active snapshots.

In some implementations, the version space is divided into three regions as follows: the first region is defined by record group objects with timestamps less than a first timestamp cutoff, the second region is defined by record group objects with timestamps greater than the first timestamp cutoff and less than a second timestamp cutoff, and the third region is defined by record versions with timestamps greater than the first timestamp cutoff. The first timestamp cutoff is a minimum timestamp among a global snapshot timestamp tracker and one or more per-table snapshot timestamp trackers. The second timestamp cutoff is the minimum timestamp among the global snapshot timestamp tracker.

FIG. 10 is a flowchart of an example method 1000 for performing hybrid garbage collection, including group garbage collection and interval garbage collection, in a database environment using multi-version concurrency control. The example method 1000 can be performed, at least in part, by a computing device (e.g., by computing devices operating a database management system).

At 1010, an ordered set of record group objects is obtained. Each record group object supports grouping of a plurality of record versions for records in the database environment. For example, a record group object can group one or more transactions, with their associated record versions, that were committed together and assigned a single group commit timestamp value.

At 1020, for each record group object in the ordered set, an immediate successor subgroup is determined. An immediate successor subgroup for a given record group object contains record versions of the given record group object that have immediate successor record versions in the next record group object in the ordered set.

At 1030, interval garbage collection is performed for record versions contained in the immediate successor subgroups. For example, an ordered set of record version timestamps can be obtained for record versions in the immediate successor subgroups for a given record. Record versions can then be identified that are not visible to any active snapshots (e.g., using visible intervals). Interval garbage collection can be performed for the record versions for each of the records represented in the immediate successor subgroups.

At 1040, record versions identified by the interval garbage collection are deleted.

Example 5—Computing Systems

Figure 11:
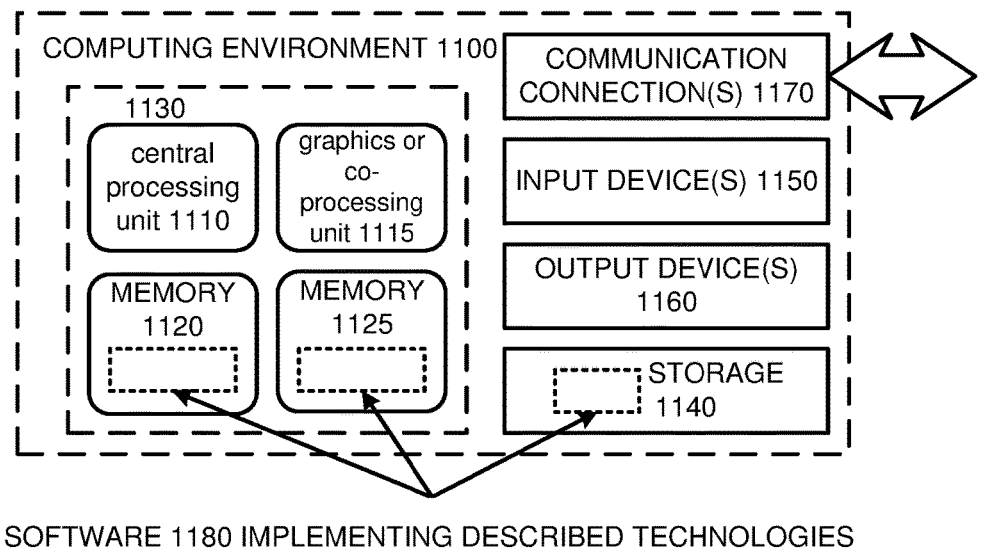
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), nonvolatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 6—Cloud Computing Environment

Figure 12:
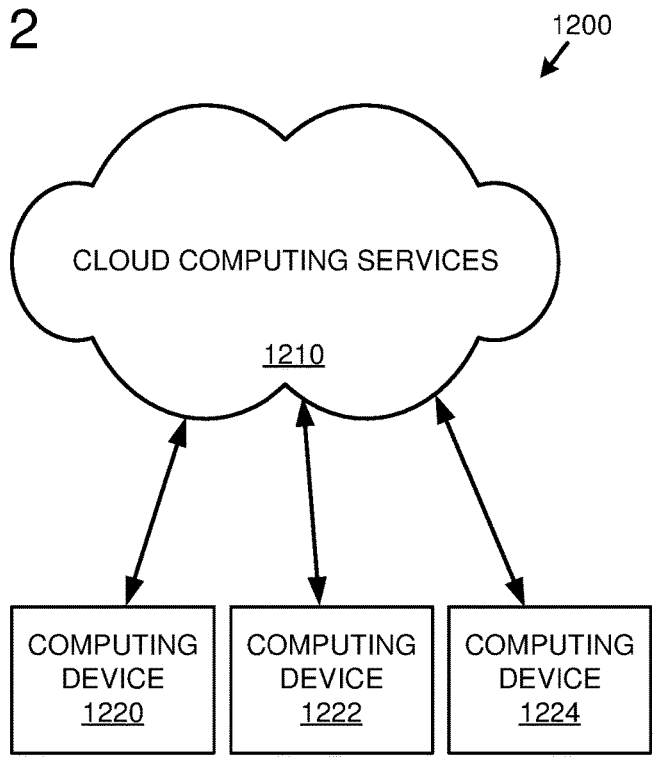
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 7—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by a computing device, for performing interval garbage collection in a database environment using multi-version concurrency control (MVCC), the method comprising:
   obtaining a set of active snapshot timestamps for corresponding active snapshots in the database environment;
   obtaining a set of record version timestamps for corresponding record versions associated with a record in the database environment;
   using the set of active snapshot timestamps and the set of record version timestamps, identifying one or more of the record versions that are not visible to any of the active snapshots, wherein the identified record versions have record version timestamps that are greater than a minimum of the set of active snapshot timestamps; and
   collecting the identified record versions as garbage record versions.

2. The method of claim 1, wherein identifying one or more of the record versions that are not visible to any of the set of active snapshots comprises:
   determining a visible interval for a record version; and
   determining whether there are any active snapshots that are within the visible interval.

3. The method of claim 2, wherein the visible interval is from the record version timestamp for the record version up to, but not including, a next greater record version timestamp in the set of record version timestamps.

4. The method of claim 1, wherein identifying one or more of the record versions that are not visible to any of the set of active snapshots comprises:
   for each record version:
      determining a visible interval for the record version, wherein the visible interval is from the record version timestamp for the record version up to, but not including, a next greater record version timestamp in the set of record version timestamps;
      determining whether there are any active snapshots that are within the visible interval; and
      when there are no active snapshots within the visible interval, determining that the record version is not visible to any of the active snapshots.

5. The method of claim 1, wherein the method performs interval garbage collection without using a global minimum timestamp value.

6. The method of claim 1, wherein the record versions that are identified as garbage record versions are deleted from a version space of the database environment.

7. The method of claim 1, wherein identifying one or more of the record versions that are not visible to any of the set of active snapshots comprises:
   calculating a subset of record versions, where T represents the set of record version timestamps and $T \cap$ is the subset, that are not visible to any of the set of active snapshots, where S represents the set of active snapshot timestamps, satisfying an equation:

$$T \cap = \{t | t \in T, \text{LGN}(t+1, T) \leq \text{LGN}(t, S)\}.$$

8. The method of claim 1, further comprising:
   performing the method for one or more additional records in the database environment.

9. One or more computing devices operating a database environment using multi-version concurrency control (MVCC) configured to perform operations for interval garbage collection, the operations comprising:
   obtaining a set of active snapshot timestamps for corresponding active snapshots in the database environment;
   obtaining a set of record version timestamps for corresponding record versions associated with a record in the database environment;
   using the set of active snapshot timestamps and the set of record version timestamps, identifying one or more of the record versions that are not visible to any of the set of active snapshots, wherein the identified record versions have record version timestamps that are greater than a minimum of the set of active snapshot timestamps; and
   collecting the identified record versions as garbage record versions.

10. The one or more computing devices of claim 9, wherein identifying one or more of the record versions that are not visible to any of the set of active snapshots comprises:
    determining a visible interval for a record version; and
    determining whether there are any active snapshots that are within the visible interval.

11. The one or more computing devices of claim 10, wherein the visible interval is from the record version timestamp for the record version up to, but not including, a next greater record version timestamp in the set of record version timestamps.

12. The one or more computing devices of claim 9, wherein identifying one or more of the record versions that are not visible to any of the set of active snapshots comprises:
    for each record version:
       determining a visible interval for the record version, wherein the visible interval is from the record version timestamp for the record version up to, but not including, a next greater record version timestamp in the set of record version timestamps;
       determining whether there are any active snapshots that are within the visible interval; and
       when there are no active snapshots within the visible interval, determining that the record version is not visible to any of the active snapshots.

13. The one or more computing devices of claim 9, wherein the operations perform interval garbage collection without using a global minimum timestamp value.

14. The one or more computing devices of claim 9, wherein the record versions that are identified as garbage record versions are deleted from a version space of the database environment.

15. The one or more computing devices of claim 9, wherein identifying one or more of the record versions that are not visible to any of the set of active snapshots comprises:
    calculating a subset of record versions, where T represents the set of record version timestamps and $T \cap$ is the subset, that are not visible to any of the set of active snapshots, where S represents the set of active snapshot timestamps, satisfying an equation:

$$T \cap = \{t | t \in T, \text{LGN}(t+1, T) \leq \text{LGN}(t, S)\}.$$

16. A computer-readable storage medium storing computer-executable instructions for causing a computing device to perform operations for interval garbage collection in a database environment using multi-version concurrency control (MVCC), the operations comprising:
    obtaining an ordered set of active snapshot timestamp values for corresponding active snapshots in the database environment;

obtaining an ordered set of record version timestamp values for corresponding record versions associated with a record in the database environment;

for each record version timestamp value in the ordered set of record version timestamp values:

determining a visible interval for the record version timestamp value, wherein the visible interval is from the record version timestamp value up to, but not including, a next greater record version timestamp value in the ordered set of record version timestamp values;

determining whether there are any active snapshot timestamp values that are within the visible interval; and when there are no active snapshot timestamp values within the visible interval, adding the record version timestamp value to a garbage version set; and deleting record versions with corresponding record version timestamp value entries in the garbage version set.

17. The computer-readable storage medium of claim 16, wherein determining whether there are any active snapshot timestamp values that are within the visible interval comprises:

calculating a least greater number (LGN) for the record version timestamp with respect to the set of active snapshot timestamp values.

18. The computer-readable storage medium of claim 16, wherein the operations implement a merge-based solution for performing interval garbage collection that comprises merging the two ordered sets.

19. The computer-readable storage medium of claim 16, wherein the operations perform interval garbage collection to delete garbage record versions with record version timestamp values greater than a global minimum timestamp value.

20. The computer-readable storage medium of claim 16, the operations further comprising:

performing the operations for interval garbage collection for one or more additional records in the database environment.

* * * * *